United States Patent [19]

Takanashi et al.

[11] Patent Number: 5,264,951
[45] Date of Patent: Nov. 23, 1993

[54] SPATIAL LIGHT MODULATOR SYSTEM

[75] Inventors: Itsuo Takanashi, Kamakura; Shintaro Nakagaki, Miura; Ichiro Negishi, Yokosuka; Ryusaku Takahashi, Yokosuka; Tetsuji Suzuki, Yokosuka; Fujiko Tatsumi, Yokohama; Keiichi Maeno, Yokosuka, all of Japan

[73] Assignee: Victor Company of Japan, Ltd., Yokohama, Japan

[21] Appl. No.: 980,121

[22] Filed: Nov. 23, 1992

Related U.S. Application Data

[63] Continuation of Ser. No. 681,938, Apr. 8, 1991, abandoned.

[30] Foreign Application Priority Data

Apr. 9, 1990 [JP] Japan .................................. 2-93524
Jun. 19, 1990 [JP] Japan .................................. 2-160797

[51] Int. Cl.$^5$ ..................... G02F 1/03; G02F 1/1347; G02F 1/135; G03B 21/14
[52] U.S. Cl. .......................... 359/53; 359/72; 359/250; 359/256; 359/259
[58] Field of Search ............... 350/173, 342; 353/20, 353/31, 33, 34; 359/71, 72, 247, 634, 637, 638, 64, 53, 294, 250, 256, 259

[56] References Cited

U.S. PATENT DOCUMENTS

| | | | |
|---|---|---|---|
| 1,319,292 | 10/1919 | Kunz | 350/173 |
| 1,897,874 | 2/1933 | Tuttle et al. | 350/173 |
| 2,096,425 | 10/1937 | Dixon et al. | 350/173 |
| 2,737,076 | 3/1956 | Rock, Jr. | 350/173 |
| 2,971,051 | 2/1961 | Back | 350/173 |
| 3,333,053 | 7/1967 | Back | 350/173 |
| 4,191,456 | 3/1980 | Hong et al. | 350/242 |
| 4,416,514 | 11/1983 | Plummer | 359/64 |
| 4,423,927 | 1/1984 | Bly | 359/72 |
| 4,461,542 | 7/1984 | Gagnon | 350/342 |
| 4,541,691 | 9/1985 | Bozak | 359/64 |
| 4,650,286 | 3/1987 | Koda et al. | 350/342 |
| 4,770,500 | 9/1988 | Kalmanash et al. | 359/64 |
| 4,867,536 | 9/1989 | Pidsosny et al. | 359/64 |
| 4,933,751 | 6/1990 | Shinonaga et al. | 350/173 |
| 4,968,120 | 11/1990 | Depp et al. | 359/64 |
| 4,981,352 | 1/1991 | Tejima et al. | 350/173 |
| 5,039,209 | 8/1991 | Takanashi et al. | 359/72 |
| 5,054,892 | 10/1991 | Takanashi et al. | 359/72 |
| 5,130,826 | 7/1992 | Takanashi et al. | 359/72 |

FOREIGN PATENT DOCUMENTS 63113304 1/1990 Japan .

*Primary Examiner*—Martin Lerner
*Attorney, Agent, or Firm*—Michael N. Meller

[57] ABSTRACT

There is provided an optical system for a spatial light modulator. The system comprises a light source for emitting an unpolarized light, a separator for separating a first linearly polarized light having a specified plane of polarization from the unpolarized light and polarizer for rotating the plane of polarization of the first linearly polarized light at a specified angle different from the specified angle to obtain a second linearly polarized light, wherein the second linearly polarized light is adopted as a reading light. Also provided is a method of photomodulation, comprising the steps of separating a light in the region of a specified wavelength from an unpolarized light, separating a first linearly polarized light having a specified plane of polarization from the light and obtaining a second linearly polarized light by rotating the plane of polarization of the first linearly polarized light at a specified angle.

5 Claims, 12 Drawing Sheets

SPATIAL LIGHT MODULATOR SYSTEM

This application is a continuation, of application Ser. No. 681938, filed Apr. 8, 1991, now abandoned.

BACKGROUND OF THE INVENTION

This invention relates to a spatial light modulator and a display unit in which the spatial light modulator is applied.

The spatial light modulator in which the spatial light modulator element operating in the birefringent mode is used, is used as the component of the display unit for example.

PROBLEM TO BE SOLVED BY THE INVENTION

The spatial light modulator element which is used as the component of the spatial light modulator and operates in the birefringent mode, includes, for example, the reflex spatial light modulator element SLMr having the configuration as illustrated in FIG. 1 or FIG. 2 or transmission spatial light modulator element SLMt having the configuration as illustrated in FIG. 3.

The modulator element SLMr illustrated in FIG. 1 and FIG. 2 has the electrodes Et1 and Et2, the photoconductive layer component PCL (herein after called "component PCL"), the dielectric mirror DML reflecting the read light, the photo-modulation layer component PML (hereinafter called "component PML") (for example, the photo-modulation layer such as the single crystal of lithium niobate or the liquid crystal layer, a high polymer-liquid crystal composite film, the lead lanthanum zirconate titanate (PLZT) and others). Further, WL is the write light to write the optical image as the charge in the modulator element SLMr, and RL is the read light used for reading out the charge image formed in the modulator element.

The modulator element SLMr in FIG. 1 has further the shield film SM. The shield film SM acts so that the write light WL does not reach the read side and the read light RL does not reach the write side.

The electrode Et1 described above is transparent for the write light WL and the electrode Et2 is transparent for the read light RL.

In the modulator element SLMr illustrated in FIG. 1 and FIG. 2, when the field is applied between both ends of the component PCL by connecting the electrodes Et1 and Et2 with the power source E and the write light WL is sent from the electrode Et1 side, the write light WL sent to the modulator element passes through the electrode Et1 and reaches the component PCL.

Since the electric resistance value of the component PCL changes according to the intensity distribution of write light WL reaching it, in the modulator element SLMr in FIG. 1, the charge image of the intensity distribution corresponding to the intensity distribution of write light WL reaching the component PCL is produced on the boundary surface between the component PCL and the shield film SM.

Further, in the modulator element SLMr in FIG. 2, the charge image of the intensity distribution corresponding to the intensity distribution of write light WL reaching the component PCL is produced on the boundary surface between the component PCL and the dielectric mirror DML.

When the read light RL of a certain intensity is incident from the electrode Et2 side in the modulator element SLMr in which the charge image corresponding to the intensity distribution of the write light WL is produced as described above, the read light RL passes through the component PML before being reflected by the dielectric mirror, passes through the component PML again and is emitted from the electrode Et2.

Said read light RL is emitted from the electrode Et2 side as the read light RLr in the condition that the plane of polarization of read light (linearly polarized light) is changed according to said charge image.

Therefore, said read light RLr is changed in its condition of read according to the charge distribution of charge formed on the boundary surface between the component PCL and the shield film SM in FIG. 1 or between the component PCL and the dielectric mirror DML in FIG. 2.

Next, the following (1) and (2) can be used as the transmission spatial light modulator element SLMt which operates in the birefringent mode as illustrated in FIG. 3. (1) The transmission spatial light modulator element in which the photoconductive layer component PCL1 {the photoconductive layer component, which is insensitive to the read light RL in practical use, for example, BSO ($Bi_{12}SiO_{20}$) and organic photosensitive materials (PVK, photosensitive azo-material phthalocyanine, etc.)} which is sensitive at least to the light in the range of wave length of write light WL and is not sensitive to the light in the range of wave length of read light RL is used to form it. (2) The transmission spatial light modulator element in which the photomodulation layer component which has a property of memory (liquid crystal, PLZT) is used to form it.

At first, when the modulator element SLMt illustrated in FIG. 3 is formed as an element which has the configuration of said (1), it is formed on the substrate BP1 by laminating the electrode Et1, the component $PCL_1$ which is sensitive at least to the light in the wavelength range of write light WL and is not sensitive to the light in the wavelength range of read light RL, the component PML in which the condition of birefringence changes according to the intensity distribution of electric field and the condition of plane of polarization of read light RL can be changed, the electrode Et2 and the substrate BP2.

Said electrode Et1 is formed to be transparent at least to the write light WL and said electrode Et2 is formed to be transparent at least to the read light RL.

Therefore, in said modulator element SLMt having the configuration of (1), when its electrodes Et1 and Et2 are connected to the power supply E and the write light WL in the wavelength range to which the component $PCL_1$ is sensitive is incident from the electrode Et1 side, the write light WL passes through the electrode Et1 and reaches the component $PCL_1$.

The charge image with the intensity distribution corresponding to the intensity distribution of the write light WL which reaches the component $PCL_1$ is produced on the boundary surface between the component $PCL_1$ and the component $PML_1$ because the electric resistance of the component $PCL_1$ is changed according to the intensity distribution of write light WL which reaches the component $PCL_1$.

When the read light RL of a certain intensity in the wavelength range to which the component $PCL_1$ is insensitive is incident from the electrode Et1 side of modulator element SLMt in which the charge image is formed corresponding to the intensity distribution of the write light WL as described above, the read light RL passes from the electrode Et1 through the component PCL$_1$ and the component PML to the electrode Et2, and includes the information corresponding to the intensity distribution of electric field which is applied to the component PML by the photoelectric effect, and is emitted from the electrode Et2 side, because the refractive index of said component PML is changed by the photoelectric effect according to the electric field.

The component PCL$_1$ is insensitive to the read light RL and the photoconductive effect is not generated on the component PCL$_1$ even if the read light RL passes through the component PCL$_1$. Therefore, the read light RL does not distrub the charge image in the boundary between the component PCL$_1$ and the component PML.

Next, when the modulator element SLMt illustrated in FIG. 3 is formed by using the photo-modulation layer component PML$_1$ having a property of memory as the photo-modulation material layer component which is used for its configuration as in above mentioned (2), it is formed on the substrate BP1 by laminating the electrode Et1, the component PCL, the component PML$_1$ which can store the intensity distribution of applied electric field as the form of the change of birefringence (for example, birefringent type liquid crystal, birefringent type PLZT), the electrode Et2 and the substrate BP2.

In the modulator element SLMt having the configuration as in (2), the write period by the write light and the read period by the read light are deemed to be serial on the time axis, then the write and read operations are carried out.

In the modulator element SLMt having the configuration of (2), when its electrode Et1 and Et2 are connected to the power supply E and the write light WL is incident from the electrode Et1 side, the write light WL passes through the electrode Et1 and reaches the component PCL.

The charge image with the intensity distribution corresponding to the intensity distribution of the write light WL which reaches the component PCL is produced on the boundary surface between the component PCL and the component PML$_1$ because the electric resistance of the component PCL is changed according to the intensity distribution of write light WL which reaches the component PCL.

When the electric field by said charge image is applied to the component PML$_1$ having a property of memory, the component PML$_1$ stores the intensity distribution of electric field applied to it as a form of change of birefringence. The content of the storage is held even if said write light disappears.

Next, when the read light of a certain intensity is incident from the electrode Et1 side of modulator element SLMt, the read light RL is transmitted from the electrode Et1, through the component PCL and the component PML$_1$ which stores the charge image corresponding to the intensity distribution of write light WL as the change of condition of birefringence and to the electrode Et2. Thus, the read light includes the information stored in the component PML$_1$ and is emitted from the electrode Et2 side.

The degree of modulation which is given to the read light by the component PML used in the modulator elements SLMr and SLMt described in reference to FIGS. 1-3 is changed according to the wavelength of read light. Therefore, when the read light is not in a narrow wavelength range, the reproduced image formed by the read light, which is outputted from the modulator element SLMr and the modulator element SLMt, has a lower contrast ratio.

To solve the above-mentioned problem, light of single wavelength, such as laser beams can be used as the read light RL, but laser beams of large output are necessary for the read light RL to get a bright reproduced image, so that this solution is difficult to adopt.

Therefore, in the image display unit, the read light of narrow wavelength range was obtained by sending the light radiated from the usual light source of large output to the optical filter of absorbing filter etc. such as dichroic filter and colored glass. But in said optical filter conventionally used, when it is formed having a narrow passband, its reflection and transmission factors at the central wavelength of its passband are smaller than that of wide passband and the light source which can radiate light of very large output is required to generate the read light possible to display the reproduced image of high luminance, resulting in the low efficiency in use of light.

Next, when the electro-magnetic radiation beam (its typical example is 'light' hereinafter) is irradiated to anisotropic materials (particularly smectic and nematic structures), such as liquid crystal, which are provided in the photo-modulation layer component, two kinds of transmission light are obtained by birefringence. Of these two kinds of light, the light having a velocity (refractive index) independent of propagating direction and which obeys Snell's law for ordinary isotropic medium, is called "ordinary ray". The light having a velocity (refractive index) which is different depending upon the propagating direction and which does not obey Snell's law is called "extraordinary ray". The ordinary ray and the extraordinary ray are separated for uniaxial crystal and the vibration direction of electric flux density vector is perpendicular to the principal plane (plane including propagating direction and optic axis) for the ordinary ray and parallel for the extraordinary ray.

Here, the birefringence Δn is given by $$\Delta n = n_y - n_x \qquad (1)$$

where nx and ny are the refractive indexes in x and y directions respectively and the angle θ formed by axes of ordinary and extraordinary rays in the anisotropic medium is determined according to the birefringence Δn. Further, the phase difference, which is determined by the angle θ, the modulation layer thickness d of medium (see FIG. 4(A)) and the wavelength λ of light, is produced. This relation is called "retardation R" (R=Δn·d/λ). The change of θ (that is, phase shift) is determined by this retardation R and the change is sin$^2$ (πR). Here, n is the director of modulation layer.

In the liquid crystal having a birefringent property, the birefringence depends upon the electric field (drive voltage) applied thereto, and the transmission intensity of light (transmittance repeatedly increases and decreases with increased drive voltage). Consequently, controlling the applied voltage permits changing the intensity of light passing through the liquid crystal film and now researches are increasing on the display, record, rerecord, etc. of image and character information.

In the electromagnetic radiation beam modulation method the electromagnetic radiation beam is modulated by using the phase difference between the ordinary ray and the extraordinary ray which are emitted through the anisotropic medium such as said liquid crystal when either or both sides of input (incident) and output (emitted) of electro-magnetic radiation beam is a wide band, the dependence of modulation component on wavelength such that the operating point is moved by the wavelength λ because the modulation (factor) is changed according to the wavelength λ of incident light was a fundamental problem.

The relation between the applied voltage and the transmission intensity of birefringent liquid crystal (membrane) is described below with reference to FIG. 5. The curve a (continuous line) and the curve b (dashed line) in FIG. 5 are electro-magnetic radiation beams of mutually different wavelength. The transmission intensity of curve a is maximum at the drive voltage Va and minimum at the drive voltage Vb. Namely, the curve a is "bright (maximum transmission intensity)" at the drive voltage Va and "dark (minimum transmission intensity)" at Vb in the case of application to the display unit. When the wavelength of curve b also exists, however, the curve a does not become "dark" at Vb and becomes "bright" at a different wavelength due to the influence of curve b. Therefore, even if black is required to be displayed, sufficient black is not obtained on the display unit.

SUMMARY OF THE INVENTION

This invention provides an optical system for an optical device (a spatial light modulator) in which an optical image is written by a writing light as a charge image by photoelectric effect and which reproduces the image as a linearly polarized light having the image by rotating a plane of polarization of a reading light at a first specified angle by photomodulation.

The optical system comprises a light source for emitting an unpolarized light, separation means for separating a first linearly polarized light having a specified plane of polarization from the unpolarized light and polarization means for rotating the plane of polarization of the first linearly polarized light at a second specified angle different from the first specified angle to obtain a second linearly polarized light, wherein the second linearly polarized light is adopted as the reading light.

Thereby, the reproduced image of high contrast ratio can be obtained by using the read light obtained in the high efficiency in use of light source.

Furthermore, this invention provides a method of photomodulation, comprising the steps of separating an electro-magnetic radiation beam in the region of a specified wavelength from an unpolarized electro-magnetic radiation beam, separating a first linearly polarized electro-magnetic radiation beam having a specified plane of polarization from the electro-magnetic radiation beam and obtaining a second linearly polarized electro-magnetic radiation beam by rotating the plane of polarization of the first linearly polarized electro-magnetic radiation beam at a specified angle.

As described above, according to the method of photomodulation, the phenomenon that the output is different according to the wavelength will be reduced.

DESCRIPTION OF THE PREFERRED EMBODIMENTS

Figure 1:
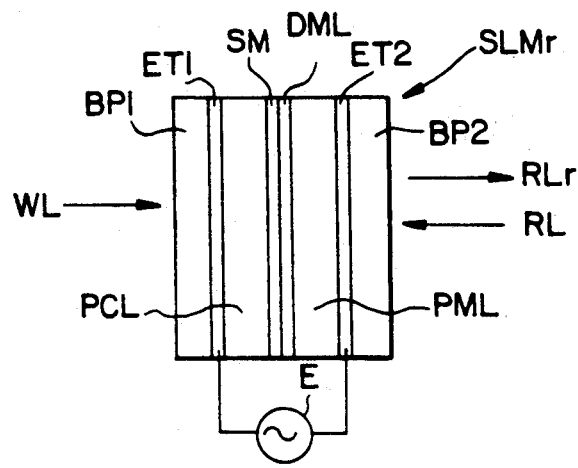
FIGS. 1 and 2 are side sectional views showing examples of configuration of conventional reflex spatial light modulator element.

This invention will now be described in detail on reference to the accompanying drawings.

Throughout the drawings, like reference numerals are used to designate like or equivalent elements for the sake of simplicity of explanation.

In each drawing, SLMr is a reflex spatial light modulator element operating in the birefringent mode (reflex light-light conversion element) SLMr and for example, is the configuration is described with reference to FIGS. 1 and 2 can be used as this reflex spatial light modulator element SLMr.

The drawing symbol of reflex spatial light modulator element used in the figure has added thereto further suffixes r, g and b in order to show the following distinction of modulator element SLMr; that is, when the optical image which is written in the modulator element SLMr by the write light WL is a red image obtained by the three color separation of the optical image of display object, the suffix r is added to the modulator element as SLMrr. Further when the optical image which is written in the modulator element SLMr by the write light WL is a green image obtained by the three color separation of the optical image of display object, the suffix g is added to the modulator element as SLMr. When the optical image which is written in the modulator element SLMr by the write light WL is a blue image obtained by the three color separation of the optical image of display object, the suffix b is added to the modulator element SLMrb. Hereinafter, when the modulation element is described without distinction of the modulator element SLMrr, SLMrg and SLMrb, the modulator element SLMr is used.

Further, in each drawing, SLMt is a transmission spatial light modulator element operating in the birefringent mode (transmission light-light conversion element) SLMt and for example the configuration described with reference to FIG. 3 can be used as this modulator element SLMt.

The drawing symbol of transmission spatial light modulator element used in the figure has added thereto further suffixes r, g and b in order to show the following distinction of modulator element SLMt. That is, when the optical image which is written in the modulator element SLMt by the write light WL is a red image obtained by the three-color separation of the optical image of display object, the suffix r is added to the modulator element as SLMtr. When the optical image which is written in the modulator element SLMt by the write light WL is a green image obtained by the three-color separation of the optical image of display object, the suffix g is added to the modulator element as SLMtg. When the optical image which is written in the modulator element SLMt by the write light WL is a blue image obtained by the three color separation of the optical image of display object, the suffix b is added to the modulator element as SLMtb. Hereinafter, when the modulator element is described without distinction of the modulator element SLMtr, SLMtg and SLMtb, the modulator element SLMt is used.

Figure 6:
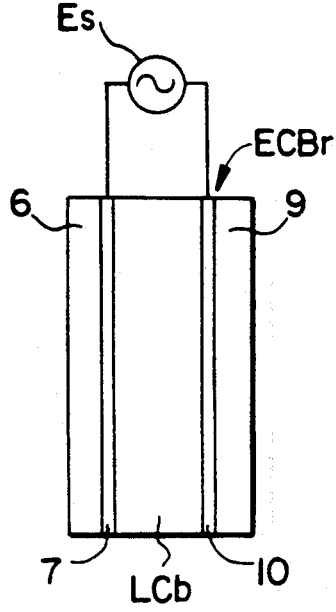
FIG. 6 is a side sectional view showing an example of configuration of the electrically controlled birefringent liquid crystal element of reflector type.

Next, the reflex electrically controlled birefringent liquid crystal element ECBr is described. The configuration illustrated in FIG. 6 for example, which is formed by laminating the transparent electrode 7, the liquid crystal layer LCb operating in the birefringent mode, the reflection film 10 and a substrate 9 on a substrate 6 can be used as this liquid crystal element ECBr. In FIG. 6, the power supply Es is connected to the transparent electrode 7 and the reflection film 10. Said reflection film 10 may be formed of aluminum evaporation film for example and the reflection film 10 is also used for the electrode.

The drawing symbol of reflex electrically controlled birefringent liquid crystal element used in the figure has added there to additional suffixes r, g and b in order to show the following distinction of liquid crystal ECBr. For the liquid crystal element to which the read light of a red optical image of display object is supplied, the suffix r is added as ECBrr. For the liquid crystal element to which the read light of a green optical image of display object is supplied, the suffix g is added as ECBrg. For the liquid crystal element to which the read light of a blue optical image of display object is supplied, the suffix b is added as ECBrb. Hereinafter, when the liquid crystal element is described without distinction of the liquid crystal element ECBrr, ECBrg and ECBrb, the liquid crystal element ECBr is used.

Figure 7:
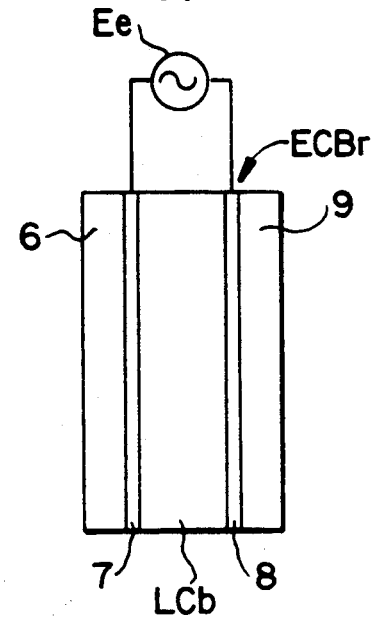
FIG. 7 is a side sectional view showing an example of configuration of the electrically controlled birefringent liquid crystal element of transmission type.

Further, the transmission double refraction field control liquid crystal element ECBt is described. The configuration illustrated in FIG. 7 for example, which is formed by laminating the transparent electrode 7, the liquid crystal layer LCb operating in the birefringent mode, the transparent electrode 8 and the substrate 9 on the substrate 6 can be used as this liquid crystal element ECBt. In FIG. 7 the power supply Ee is connected to the transparent electrodes 7 and 8.

The drawing symbol of liquid crystal element ECBt used in the figure has added thereto additional suffixes r, g and b in order to show the following distinction of liquid crystal ECBt. For the liquid crystal element to which the read light of a red optical image of display object is supplied, the suffix r is added as ECBtr, further, for the liquid crystal element to which the read light of a green optical image of display object is supplied, the suffix g is added as ECBtg. For the liquid crystal element to which the read light of a blue optical image of display object is supplied, the suffix b is added as ECBtb. Hereinafter, when the spatial light modulator element is described without distinction of liquid element ECBtr, ECBtg and ECBtb, the liquid crystal element ECBt is used.

Figure 8:
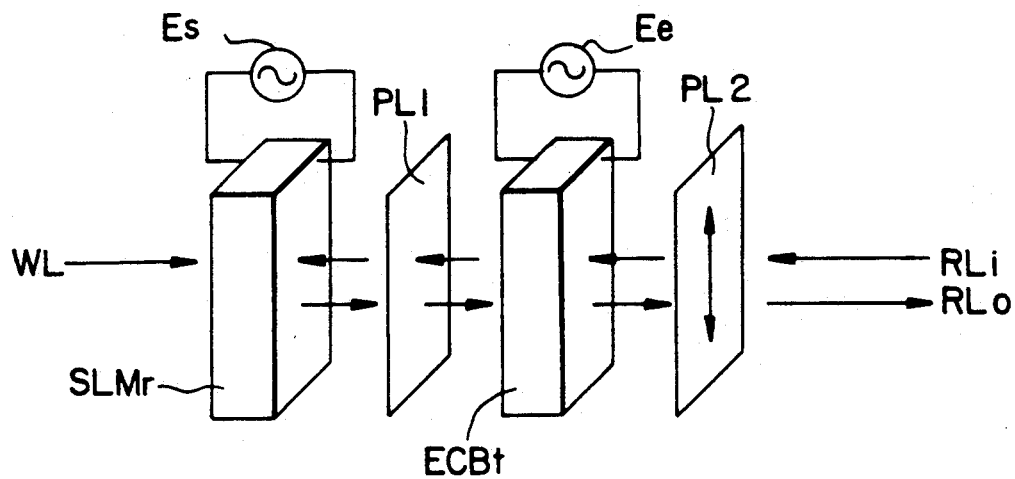
FIG. 8 is a block diagram to explain the forming and operation principles of the spatial light modulator according to this invention, which includes the reflex spatial light modulator element operating in the birefringent mode.

With reference to FIG. 8, the configuration and operation principles of the spatial light modulator, which contains the reflex spatial light modulator element SLMr operating in the birefringent mode, are explained.

Figure 2:
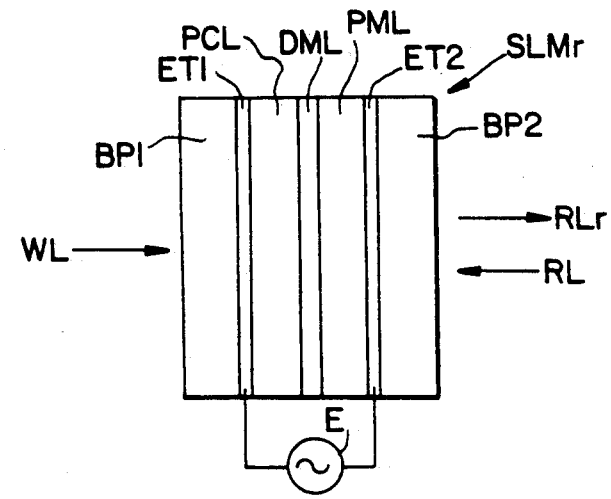

At first in FIG. 8, in the read of information from the modulator element SLMr in which the information is written by the write light WL, the read light RLi is incident on the modulator element through the optical path of the polarizer PL2, the transmission electrically controlled birefringent liquid crystal element ECBt, the polarizer PL1, the operation as described in reference to FIGS. 1 and 2 in the modulator element SLMr. The read light RLo modulated by the written information is emitted from the modulator element SLMr and the read light RLo is outputted through the optical path of the polarizer PL1, the liquid crystal element ECBt, and the polarizer PL2.

In FIG. 8 the polarizer PL2 in the optical path through which the read light passes, the liquid crystal element ECBt, the polarizer PL1 and the photo-modulation layer component operating in the birefringent mode in the modulator element SLMr form the wavelength selection filter. The read light RLi for the spatial light modulator is incident on the modulator element SLMr as the read light of a narrow wavelength band, clue to said wavelength selection filter.

Figure 9:
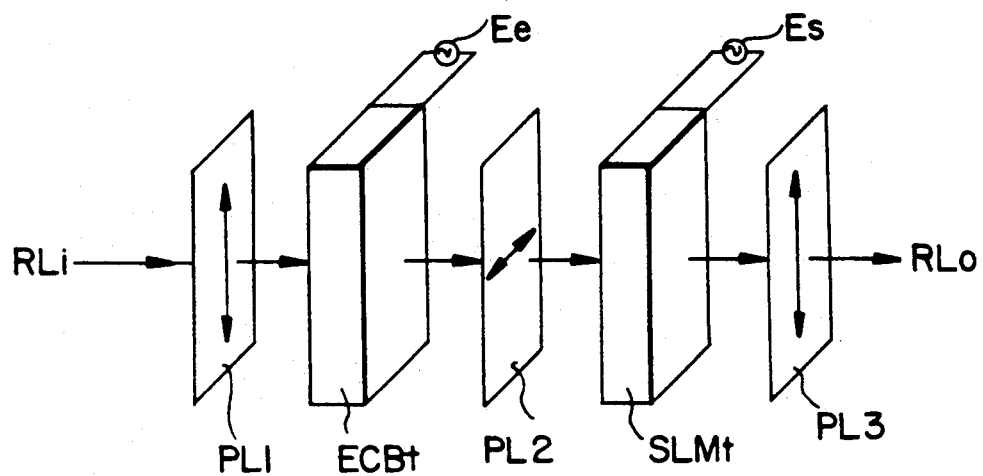
FIG. 9 is a block diagram to explain the forming and operation principles of the spatial light modulator according to this invention, which includes the transmission spatial light modulator element operating in the birefringent mode.

Next, according to FIG. 9, the configuration and operation principles of the spatial light modulator, which is formed including the transmission space modulator element SLMt operating in the birefringent mode, are explained.

In FIG. 9 the read light RLi supplied to the spatial light modulator is outputted as the read light RLo through the optical path of the polarizer PL1, the transmission electrically controlled birefringent liquid crystal element ECBt, the polarizer PL2, the modulator element SLMt, and the polarize PL3.

Figure 3:
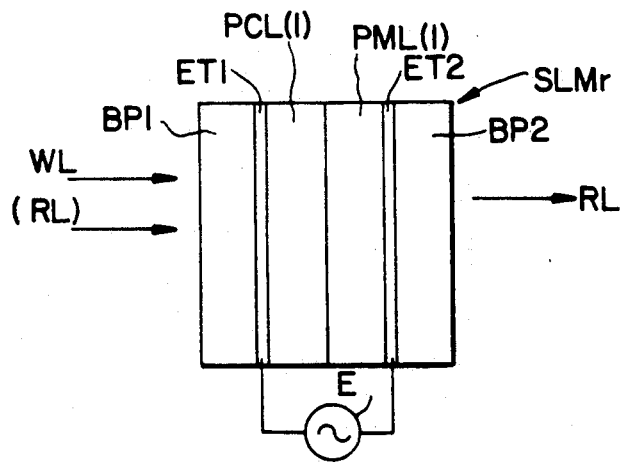
FIG. 3 is a side sectional view showing an example of the configuration of transmission spatial light modulator element.

Said modulator element SLMt carries out the write and read operations as described in reference to FIG. 3, and the read light RLo modulated by the written information is emitted from the modulator element SLM to which the read light is supplied as described above.

In FIG. 9, the polarizer PL1 in the light course through which the read light passes, the liquid crystal element ECBt, the polarizer PL2, the photo-modulation layer component operating in the brirefringent mode in the modulator element SLMt and the polarizer PL3 form the wavelength selection filter. The read light RLi for the spatial light modulator is incident on the modulator element SLMt as the read light of a narrow wavelength band due to said wavelength selection filter.

Figure 10:
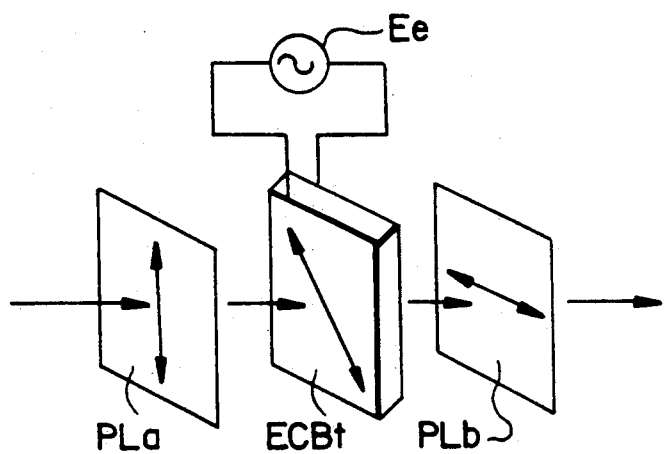
FIG. 10 is a block diagram to explain the forming and operation principles of a known wavelength selection filter which is formed by using the electrically controlled birefringent liquid crystal element and the polarizer.

In addition, with regard to the wavelength selection filter which is formed of the transmission electrically controlled birefringent liquid crystal element and the polarizer, Mr. Sato, Mr. Kato, Mr. Kano, Mr. Hanazawa and Mr. Uchida of Tohoku University presented the report on the characteristics etc. of the wavelength selection filter which is formed by successively arranging many sets of the lement which is formed of the polarizer PLa, the liquid crystal element ECBt and the polarizer PLb as roughly shown in FIG. 10 in the 9th International Display Research Conference held under the joint auspices of the U.S. SID and the Institute of Television Engineers of Japan at Kyoto Park Hotel in Kyoto on Oct. 16 to 18, 1989. The content is described on pages 392 to 395 in the minutes of the 9th International Display Research Conference.

In the spatial light modulator according to this invention, as described about FIGS. 8 and 9, the wavelength selection filter is formed by using the modulator element SLMr or SLMt besides the polarizer PL and the liquid crystal element ECBt, or by using the polarizer PL and the liquid crystal element ECBr as shown in the embodiment described below.

Figure 11A:
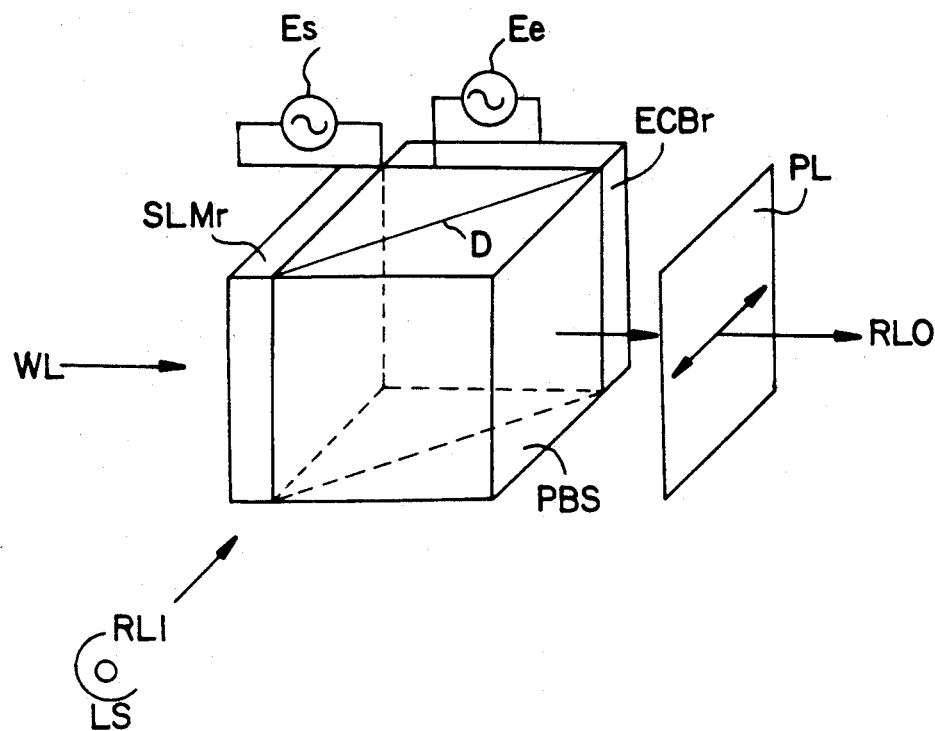
FIGS. 11A and 11B are diagrams of an embodiment of a spatial light modulator constructed in accordance with the principles of the present invention using a single polarization beam splitter.
Figure 11B:
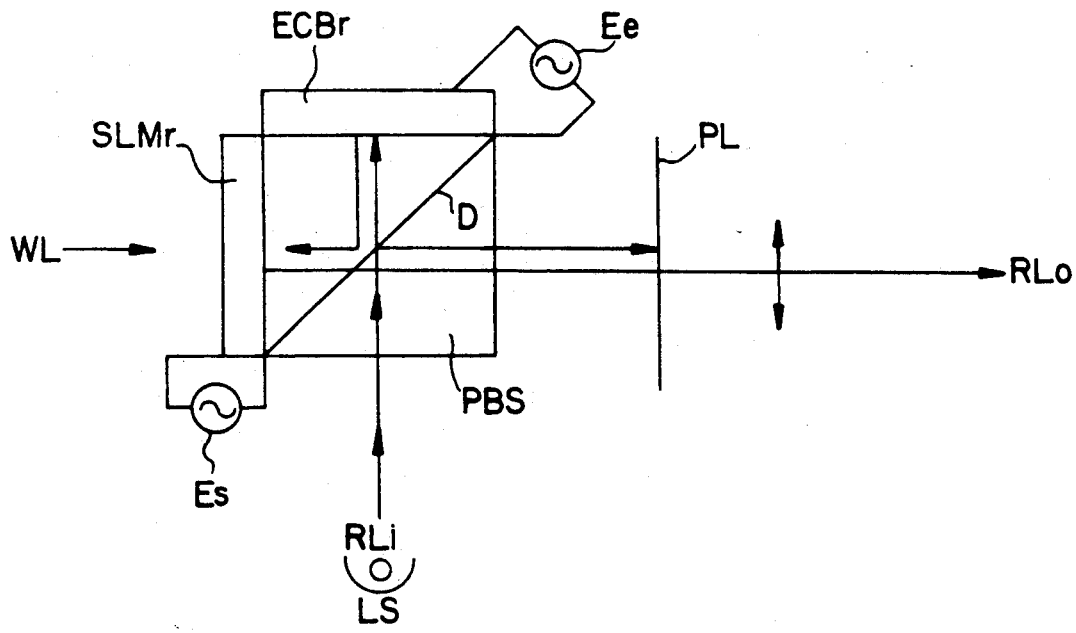

FIGS. 11A and 11B show an embodiment of the spatial light modulator according to this invention. In FIGS. 11A and 11B, PBS is the polarization beam splitter and when the read light RLi of unpolarized light inputted from a light source LS to the spatial light modulator is incident on the polarization beam splitter PBS, P polarized light in the read light RLi is emitted from the polarization beam splitter PBS through the polarizer D in the polarization beam splitter and is incident on the liquid crystal ECBr.

Further, S polarized light in said read light RLi is emitted from the polarization beam splitter after reflection by the polarizer D and is incident on the polarizer PL.

Said P-polarized light incident on the liquid crystal element ECBr is emitted as S polarized light from the liquid crystal element ECBr, and S-polarized light is reflected by the polarizer D and is incident on the modulator element SLMr.

Since information is written in the modulator element SLMr by the write light WL, S polarized light incident on the modulator element SLMr as described above is emitted from the modulator element SLMr in the condition modulated by said written information and incident on the polarization beam splitter PBS.

Then, the p-polarized light component of the emitted light, which is incident on the polarization beam splitter PBS and emitted from the modulator element SLMr, is emitted from the polarization beam splitter PBS through the polarizer D and incident on the polarizer PL, and passes through this polarizer PL to be the read light RLo of output.

In this spatial light modulator shown in FIGS. 11A and 11B, since the polarizer D and the liquid crystal element ECBr form the wavelength selection filter, the read light RLi incident on the spatial light modulator is changed into the read light of a narrow wavelength range by the wavelength selection filter which is formed of the polarizer in the polarization beam splitter PBS and the liquid crystal element ECRr and supplied to the modulator element SLMr.

Figure 12:
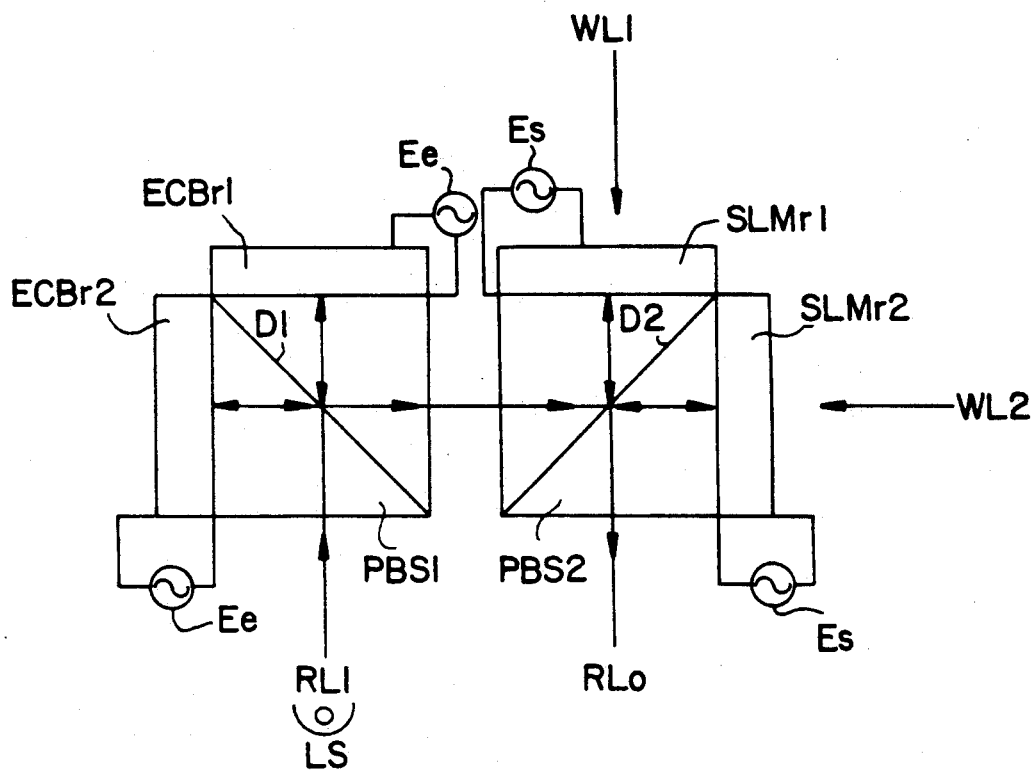
FIG. 12 is a diagram of an embodiment of a spatial light modulator constructed in accordance with the principles of the present invention and using two polarization splitters.

Next, in the spatial light modulator according to this invention as shown in FIG. 12, the read light RLi of unpolarized light inputted to the spatial light modulator is incident on the polarization beam splitter PBS1. P polarized light in the read light RLi incident on the polarization beam splitter PBS1 is emitted from the polarization beam splitter PBS1 through the polarizer D1 in the polarization beam splitter PBS1 and incident on the liquid crystal element ECBr1. Further, S-polarized light in said read light RLi is reflected on the polarizer D1 before being emitted from the polarization beam splitter PBS1 to be incident on the liquid crystal element ECBr2.

P polarized light incident on said liquid crystal element ECBr1 is emitted as S-polarized light from the liquid crystal element ECBr1, and S-polarized light is reflected on the polarizer D1, emitted from the polarization beam splitter PBS1 and incident on the polarization beam splitter PBS2.

As described above, S-polarized light incident on the polarization beam splitter PBS2 is reflected on the polarizer D2 in the polarization beam splitter PBS2, emitted from the polarization beam splitter PBS2 and incident on the modulator element SLMr1 operating in the birefringent mode.

Further, S polarized light incident on said liquid crystal element ECBr2 is emitted as P-polarized light from the liquid crystal element ECBr2, and P-polarized light is emitted from the polarization beam splitter PBS1 through the polarizer D1 in the polarization beam splitter PBS1 and incident on the polarization beam splitter PBS2.

As described above, P-polarized light incident on the polarization beam splitter PBS2 is emitted from the polarization beam splitter PBS2 through the polarizer D2 in the polarization beam splitter PBS2 and incident on the modulator element SLMr2 operating in the birefringent mode.

Since information is written in the modulator element SLMr1 by the write light WL1, S-polarized light incident on the modulator element SLMr1 as described above is emitted from the modulator element SLMr1 in the condition modulated by said written information and incident on the polarization beam splitter PBS2.

Then, the P-polarized light component of the emitted light, which is incident on the polarization beam splitter PBS2 and emitted from the modulator element SLMr1, is transmitted through the polarizer D2 and emitted from the polarization beam splitter PBS2 to be the read light RLo of output.

On the other hand, since information is written in the modulator element SLMr2 by the write light WL2, P-polarized light incident on the modulator element SLMr2 as described above is emitted from the modulator element SLMr2 in the condition modulated by said written information and incident on the polarization beam splitter PBS2.

Then, S-polarized light component of emitted light, which is incident on the polarization beam splitter PBS2 and emitted from the modulator element SLMr2, is reflected on the polarizer D2 and emitted from the polarization beam splitter PBS2 to be the read light RLo of output.

Thus, in the spatial light modulator shown in FIG. 12, the information read by the read light from the modulator element SLMr2 in which the information is written by the write light WL2 and the information read by the read light from the modulator element SLMr1 in which the information is written by the write light WL1 are combined and emitted as the read light RLo of output from the polarization beam splitter PBS2.

Then, in this spatial light modulator shown in FIG. 12, the reproduced image of large contrast ratio and higher luminance can be obtained in the condition of higher utilization efficiency of light source by expanding the combined wavelength passband. This is accomplished by slightly shifting the central wavelength in the wavelength passband of the wavelength selection filter which is formed of the polarization beam splitter PBS1, the liquid crystal element ECBr1, the polarization beam splitter PBS2 and the modulator element SLM1. Also the central wavelength is slightly shitted in the wavelength passband of the wavelength selection filter which is formed of the polarization beam splitter PBS1, the liquid crystal element ECBr2, the polarization beam splitter PBS2 and the modulator element SLM2.

Figure 13:
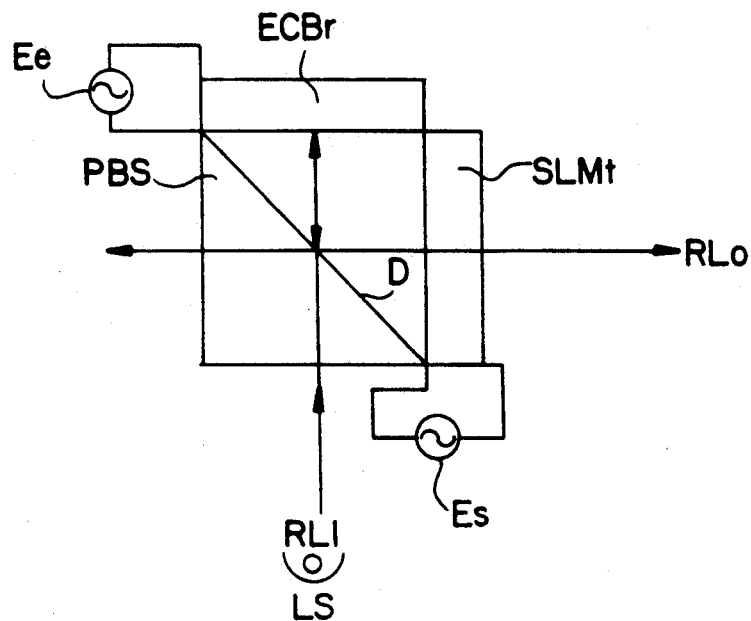
FIG. 13 is a diagram of a further embodiment of a spatial light modulator constructed in accordance with the principles of the present invention.

Next, in the spatial light modulator shown in FIG. 13, when the read light RLi of unpolarized light inputted to the spatial light modulator is incident on the polarization beam splitter PBS, P-polarized light in the read light RLi is transmitted through the polarizer D in the polarization beam splitter, emitter from the polarization beam splitter PBS and incident on the liquid crystal element ECBr.

Further, S-polarized light in said read light RLi is reflected on the polarizer in the polarization beam splitter PBS, emitted from the polarization beam splitter PBS and thrown away.

P-polarized light incident on said liquid crystal element ECBr is emitted as S-polarized light from the liquid crystal element ECBr, and S-polarized light is reflected on the polarizer D in the polarization beam splitter PBS and incident on the modulator element SLMt.

Since information is written in the modulator element SLMt by the writs light, S-polarized light incident on the modulator element SLMt as described above is emitted from the modulator element SLMt as the read light RLo in the condition modulated by said written information.

In this spatial light modulator shown in FIG. 13, since the polarizer D and the liquid crystal element ECBr form the wavelength selection filter, the read light RLi incident on the spatial light modulator is changed into the read light of a narrow wavelength range by the wavelength selection filter which is formed of the polarizer D and the liquid crystal element ECBr and supplied to the modulator element SLMt.

Figure 14:
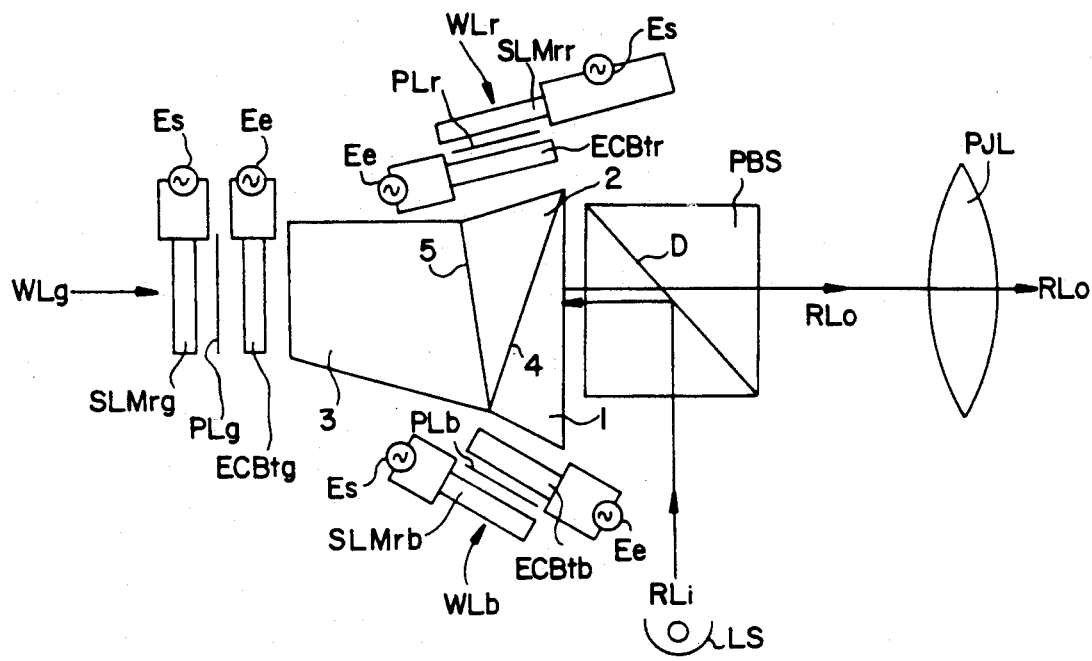
FIG. 14 is a diagram of an embodiment of a spatial light modulator constructed in accordance with the principle of the present invention and using a three color separation prism.

Next, in the spatial light modulator shown in FIG. 14, the three-color separation optical system SCA is the three color separation prism of known form which is formed by uniting 3 prisms of 1 to 3, the dichroic filter 4 in the boundary surface between the prism 1 and the prism 2, and the dichroic filter 5 in the boundary surface between the prism 2 and the prism 3. The read light RLi is incident on the prism 1 in this three-color separation prism through the polarization beam splitter PBS.

The linearly polarized light (S-wave) of specific plane of polarization in the read light RLi incident on said polarization beam splitter PBS is reflected by the polarizar D in the direction towards the prism 1 of the three-color separation prism and incident on the prism 1 of the three-color separation prism. The read light of linearly polarized light of green light wavelength range in the read light RLi incident on the prism 1 of the three-color separation prism is transmitted through both the dichroic filters 4 and 5, emitted from the prism 3 of the three-color separation prism and incident on the liquid crystal element ECBtg.

The linearly polarized light emitted from said liquid crystal element ECBtg is transmitted through the polarizer PLg and incident on the modulator SLMrg operating in the birefringent mode.

Since information is written in the modulator element SLMrg by the write light WLg, the linearly polarized light incident on the modulator element SLMrg as described above is emitted from the modulator element SLMrg in the condition modulated by said written information, transmitted through the polarizer PLg and incident on the liquid crystal element ECBtg.

The linearly polarized light of green light wavelength range in the read light emitted from the liquid crystal element ECBtg is transmitted through both the dichroic filters 5 and 4 in the three color separation prism functioning as a three color combination prism and incident on the polarization beam splitter PBS. The p wave component of the light incident on the polarization beam splitter PBS is transmitted through the polarization beam splitter PBS and incident on the projection lens PJL.

Further, the read light of linearly polarized light of red light wavelength range in the read light RLi incident on the prism 1 of said three-color separation prism from the polarization beam splitter PBS is transmitted through the dichroic filter 4, reflected on the dichroic filter 5, emitted from the prism 2 of the three-color separation prism and incident on the liquid crystal element ECBtr.

The linearly polarized light emitted from the liquid crystal element ECBtr is transmitted through the polarizer PLr and incident on the modulator element SLMrr operating in the birefringent mode.

Since information is written in the modulator element SLMrr by the write light WLr, the linearly polarized light incident on the modulator element SLMrr as described above is emitted from the modulator element SLMrr in the condition modulated by said written information, transmitted through the polarizer PLr and incident on the liquid crystal element ECBtr.

The linearly polarized light of red light wavelength range in the read light emitted from the liquid crystal element ECBtr is reflected on the dichroic filter 5 of the three color separation prism functioning as a three color combination prism, transmitted through the dichroic filter 4, incident on the polarization beam splitter PBS, and P-wave component of the light incident on the polarization beam splitter PBS is transmitted through the polarization beam splitter PBS and incident on the projection lens PJL.

Further, the read light of linearly polarized light of blue light wavelength range in the read light RLi incident on the prism 1 of said three-color separation prism from the polarization beam splitter PBS is reflected on the dichroic filter 4, emitted from the prism 1 of the three-color separation prism and incident on the liquid crystal element ECBtb.

The linearly polarized light emitted from said liquid crystal element ECBtb is transmitted through the polarizer PLb and incident on the modulator element SLMrb operating in the birefringent mode.

Since information is written in the modulator element SLMrb by the write light WLb, the linearly polarized light incident on the modulator element SLMrb as described above is emitted from the modulator element SLMrb in the condition modulated by said written information, transmitted through the polarizer PLb and incident on the liquid crystal element ECBtb.

The linearly polarized light of blue light wavelength range in the read light emitted from the liquid crystal element ECBtb is reflected on the dichroic filter 5 of the three-color separation prism functioning as a three-color combination prism, transmitted through the dichroic filter 4, incident on the polarization beam splitter PBS, and P-wave component of the light incident on the polarization beam splitter PBS is transmitted through the polarization beam splitter PBS and incident on the projection lens PJL.

The read light RLi incident on the projection lens PJL through the polarization beam splitter PBS is made to correspond with the color image which is the object of display by the intensity change by the polarization beam splitter after the read lights emitted from said modulator elements SLMrr, SLMrg and SLMrb are combined by the three color separation prism. Therefore, the optical image projected to the screen by the projection lens PJL is obtained as the image having good contrast ratio in the color image of the object of display.

In the spatial light modulator in FIG. 14, since the polarizer D in the polarization beam splitter PBS, the liquid crystal element ECBtg, the polarizer PLg and the modulator element SLMrg form the wavelength selection filter, the read light RLi incident on the spatial light modulator is changed into the read light of a narrow wavelength range by the wavelength selection filter which is formed of the polarizer D in the polarization beam splitter PBS, the liquid crystal element ECBtg, the polarizer PLg and the modulator element SLMrg and supplied to the modulator element SLMrg.

Further, since the polarizer D in the polarization beam splitter PBS, the liquid crystal element ECBtr, the polarizer PLr and the modulator element SLMrr form the wavelength selection filter, the read light RLi incident on the spatial light modulator is changed into the read light of a narrow wavelength range by the wavelength selection filter which is formed of the polarizer D, the transmission liquid crystal element ECBtr, the polarizer PLr and the modulator element SLMrr and supplied to the modulator element SLMrr in the same way, since the polarizer D, the liquid crystal element ECBtb, the polarizer PLb and the modulator element SLMrb form the wavelength selection filter, the read light RLi incident on the spatial light modulator is changed into the read light of a narrow wavelength range by the wavelength selection filter which is formed of the polarizer D, the liquid crystal element ECBtb, the polarizer PLb and the modulator element SLMrb and supplied to the modulator element SLMrb.

Figure 15:
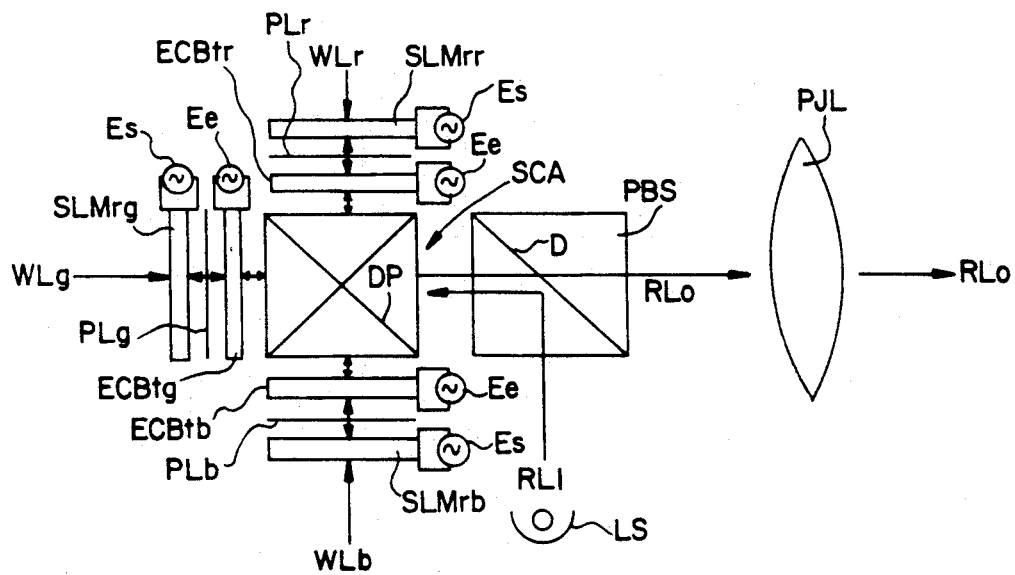
FIG. 15 is a diagram of a further embodiment of a spatial light modulator constructed in accordance with the principles of the present invention and using a three color separation prism in the form of a dichroic prism.

Next, in the spatial light modulator shown in FIG. 15, the configuration form of the three-color separation prism used as the color separation optical system SCA is different from the configuration form of the three-color separation prism used as the color separation optical system SCA in the optical system of the spatial light modulator described with regard to FIG. 14. However, the configuration and operation of the rest of the modulator shown in FIG. 15 is substantially the same as said spatial light modulator shown in FIG. 14.

In the spatial light modulator shown in FIG. 15, the three color separation prism used as a color separation optical system SCA is the dichroic prism DP and the read light RL incident on the dichroic prism DP from the beam splitter PBS is separated into three colors. Green light of three separated colors is transmitted through the liquid crystal element ECBtg and the polarizer PLg and incident on the modulator element SLMrg. Further, red light of three colors separated by the dichroic prism DP is transmitted through the liquid crystal element ECBtr and the polarizer PLr and incident on the modulator element SLMrr. Furthermore, blue light of three colors separated by the dichroic prism DP is transmitted through the liquid crystal element ECBtb and the polarizer PLb and incident on the modulator element SLMb.

Thus, also in the spatial light modulator shown in FIG. 15, the polarizer D in the polarization beam splitter PBS, the liquid crystal element ECBtg, the polarizer PLg and the modulator element SLMrg form the green wavelength selection filter. Further the polarizer D, the liquid crystal element ECBtr, the polarizer PLr and the modulator element SLMrr form the red wavelength selection filter. Further the polarizer D, the liquid crystal element ECBtb, the polarizer PLb and the modulator element SLMrb form the blue wavelength selection filter. Thus the read light RLi incident on the spatial light modulator is changed into the read light of a narrow wavelength range by the wavelength selection filter which is formed respectively and supplied to the respective modulator elements SLMrg, SLMrr or SLMrb.

Then, the beams of read light emitted from the above-mentioned modulator elements SLMrr, SLMrg and SLMrb are combined by the three-color separation prism functioning as a three-color combination system and then made to correspond with the color image which is the object of display by the light of intensity change by the polarization beam splitter PBS. Therefore, the optical image projected to the screen by the projection lens PJL is obtained as the image having good contrast ratio in the color image of the object of display.

Figure 16:
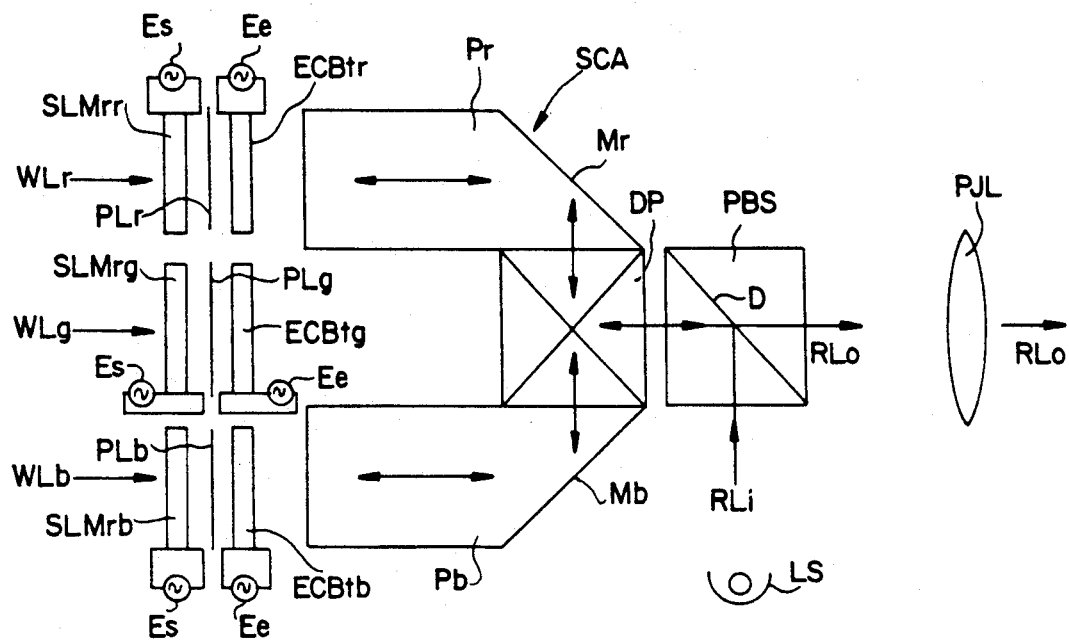
FIG. 16 is a diagram of a further embodiment of a spatial light modulator constructed in accordance with the principles of the present invention and using a three color separation optical system having a dichroic prism and additional prisms for the correction of optical path length.

Next, the three-color separation optical system SCA used in the spatial light modulator shown in FIG. 16 is formed of the dichroic prism DP and the prism Pr, Pb for the correction of optical path length and equipped with the total reflection surface Mr and Mb.

The unpolarized light radiated from the light source LS is changed into the linearly polarized light of specific plane of polarization by the polarization beam splitter and incident on the dichroic prism DP. In the dichroic prism DP, the linearly polarized light incident on it is separated into three colors and green light of three separated colors of light is transmitted through the liquid crystal element ECBtg and the polarizer PLg and incident on the modulator element SLMrg. Further red light of three colors of light separated by the dichroic prism DP is transmitted through the prism Pr, the liquid crystal element ECBtr and the polarizer PLr and incident on the modulator element SLMrr. The blue light of three color lights separated by the dichroic prism DP is transmitted through the prism Pb, the liquid crystal element ECBtb and the polarizer PLb and incident on the modulator element SLMrb.

In the spatial light modulator shown in FIG. 16 also, the polarizer D in the polarization beam splitter PBS, the liquid crystal element ECBtg, the polarizer PLg and the modulator element SLMrg form the green wavelength selection filter. The polarizer D, the liquid crystal element ECBtr, the polarizer PLr and the modulator element SLMrr form the red wavelength selection filter, and the polarizer D, the liquid crystal element ECBtb, the polarizer PLb and the modulator element SLMrb form the blue wavelength selection filter. The read light RLi incident on the spatial light modulator is changed into the read light of a narrow wavelength range by the wavelength selection filter respectively formed and supplied to the respective modulator element SLMrg, SLMrr and SLMrb. The read lights emitted from said modulator elements SLMrr, SLMrg and SLMrb are combined by the three-color separation optical system functioning as a three-color combination system and then made to correspond with the color image which is the object of display by the light of intensity change by the polarization beam splitter PBS. Therefore, the optical image projected to the screen by the projection lens PJL is obtained as the image having good contrast ratio in the color image of the object of display.

Figure 17:
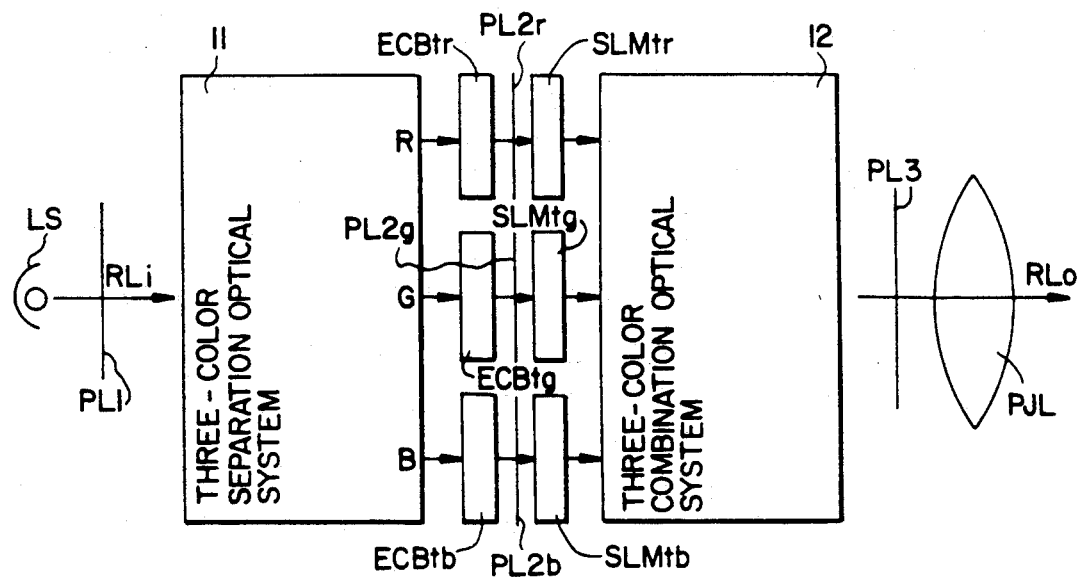
FIG. 17 is a diagram of a further embodiment of a spatial light modulator constructed in accordance with the principles of the present invention and using transmission spatial light modulator elements.

Next, in the spatial light modulator shown in FIG. 17, the unpolarized light radiated from the light source LS is changed into the linearly polarized light by the polarizer PL1 and sent to the three color separation system 11.

The linearly polarized light of red light emitted from the three-color separation optical system 11 is incident on the liquid crystal element ECBtr, the linearly polarized light of green light emitted from the three-color separation optical system 11 is incident on the liquid crystal element ECBtg and the linearly polarized light of blue light emitted from the three-color separation optical system 11 is incident on the liquid crystal element ECBtb.

The light emitted from each of liquid crystal elements ECBtr, ECBtg or ECBtb is supplied to the respective modulator element SLMtr, SLMtg or SLMtb through the respective polarizer PL2r, PL2g or PL2b respectively.

Since information is written in said each modulator element SLMtr, SLMtg or SLMtb by the write light WL, the linearly polarized light of each color incident on the modulator element SLMtr, SLMtg or SLMtb as described above is incident on the three-color combination optical system 12 in the condition modulated by the information which is written in each modulator element SLMtr, SLMtg or SLMtb.

In this spatial light modulator shown in FIG. 17, the polarizer PL1, the liquid crystal elements ECBtg, ECBtr and ECBtb, the polarizers PL2r, PL2g and PL2b, the modulator elements SLMtr, SLMtg and SLMtb and the polarizer PL3 form the wavelength selection filter. The read light RLi incident on the spatial light modulator is changed into the read light of a narrow wavelength range by the wavelength selection filter which is formed independently and supplied to each modulator element SLMtg, SLMtr or SLMtb. In this spatial light modulator shown in FIG. 17 also, the optical image projected to the screen by the projection lens PJL is obtained as the image having good contrast in the color image of the object of display.

Figure 18:
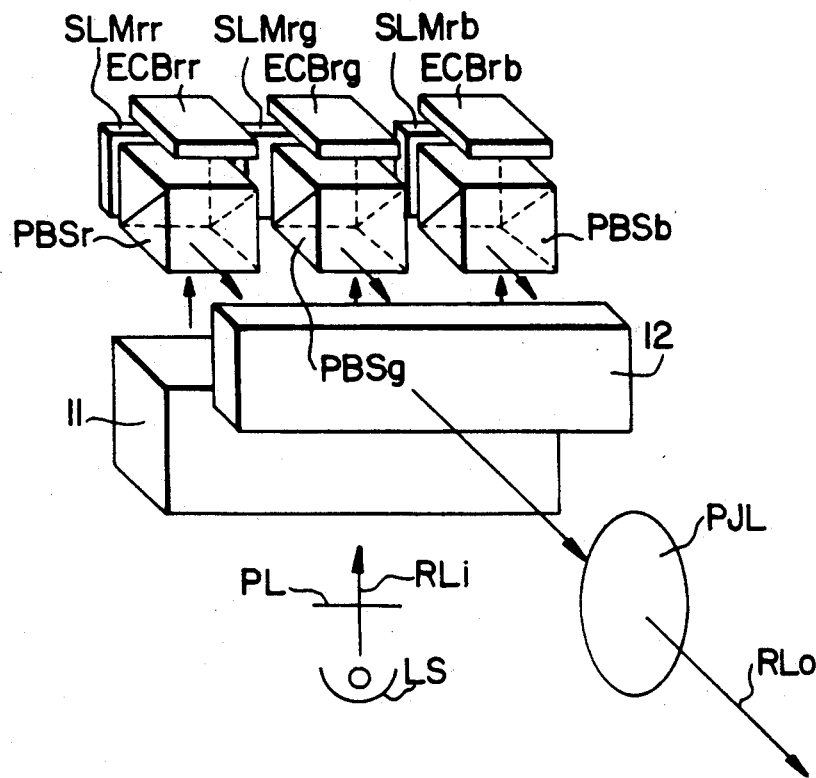
FIG. 18 is a diagram of a further embodiment of the present invention using three spatial light modulators having the configuration of the embodiment illustrated in FIGS. 11A and 11B.

Next, the spatial light modulator shown in FIG. 18 is an example of the configuration in which 3 sets of spatial light modulators of said configuration with reference to FIG. 11 as well as the three color separation optical system 11 and the three color combination optical system 12 of FIG. 17 are used to form the color image display. In the spatial light modulator shown in FIG. 11, the polarizer PL is positioned on the output side of the read light in the spatial light modulator and in the spatial light modulator shown. In FIG. 18, the polarizer PL is positioned on the input side of the read light in the spatial light modulator. However, it is clear by the explanation of the spatial light modulator shown in FIG. 11 that there is no difference in operation due to of the difference of position of the polarizer PL. The spatial light modulator shown in FIG. 19 is an example of the configuration in which 3 sets of spatial light modulators of the configuration with reference to FIG. 13 as well as the three-color separation optical system 11 and the three-color combination optical system 12 of FIG. 17 are used to form the color image display unit.

Figure 19:
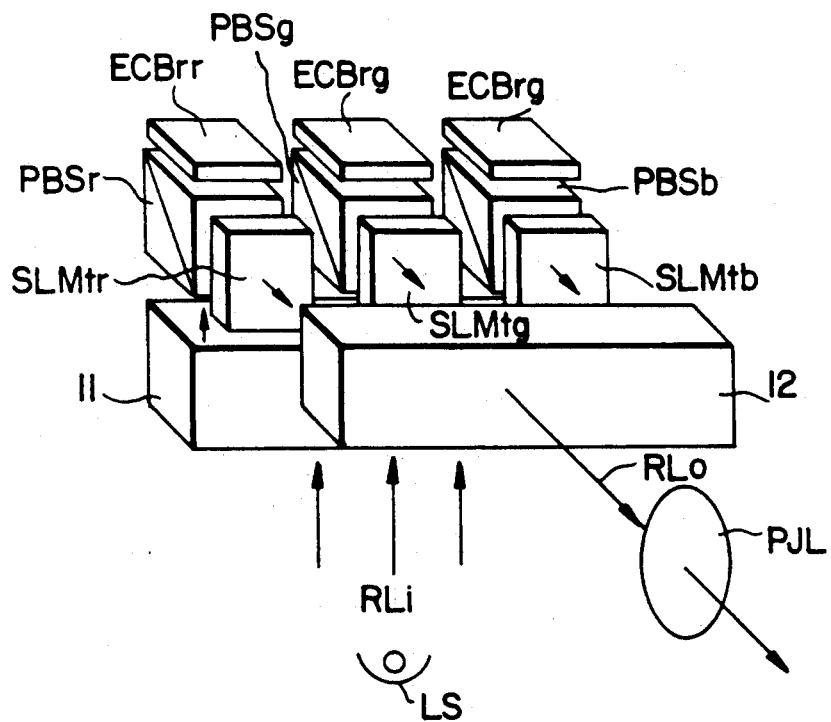
FIG. 19 is a diagram of a further embodiment of the present invention using three spatial light modulators having the configuration of the embodiment illustrated in FIG. 13.

In the spatial light modulators shown in FIG. 18 and FIG. 19 respectively, the drawing symbols given to their components include the suffixes r, g and b added to the drawing symbols given to the components in said spatial light modulators shown in FIG. 11 and FIG. 13.

Figure 20:
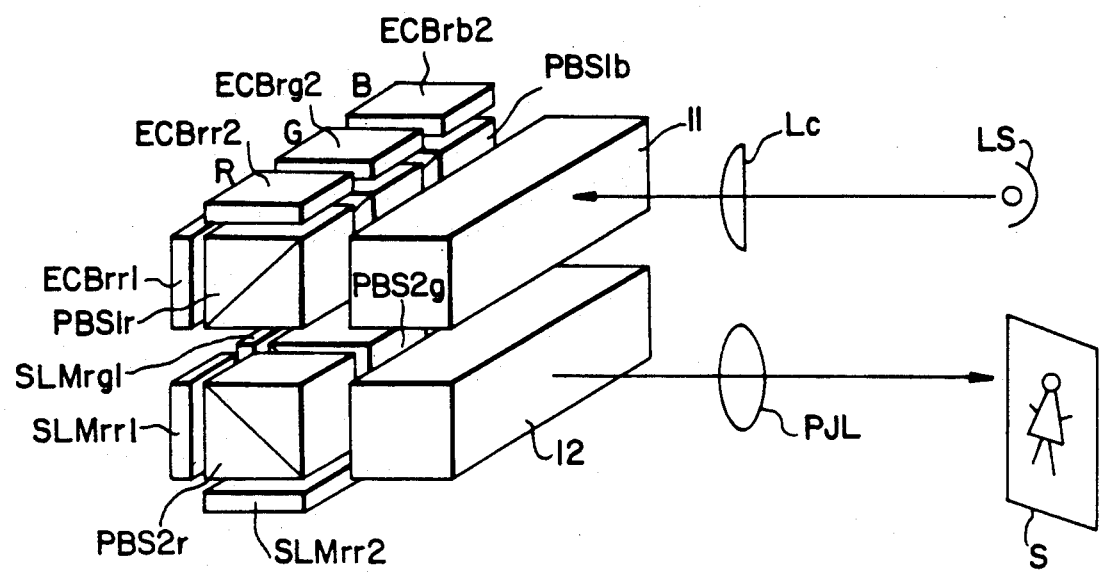
FIG. 20 is a diagram of a further embodiment of the present invention using three sets of spatial light modulators having the configuration of the embodiment illustrated in FIG. 12.

Next, the spatial light modulator shown in FIG. 20 is an example of the configuration in which 3 sets of spatial light modulators of said configuration with reference to FIG. 12 as well as the three color separation optical system 11 and the three color combination optical system 12 of FIG. 17 are used to form the color image display unit. In this spatial light modulator shown in FIG. 20, the drawing symbols given to the components include the suffixes r, g and b added to the drawing symbols given to the components in the spatial light modulator shown in FIG. 12 in order to show that they have the configurations for respective colors.

The spatial light modulator according to this invention can be used not only for said display unit but also effectively for the optical computer and many other applications.

Next, this invention provides the feature that, in the electro-magnetic radiation beam modulation method in which electro-magnetic radiation beam is modulated by using the phase difference between the ordinary ray and the extraordinary ray, controlling the electro-magnetic radiation beam band of at least one of the input and output permits to reducing the phenomenon that the operating point is changed according to the wavelength of electro-magnetic radiation beam and to lower the dependence of modulator component itself on wavelength.

Figure 4A:
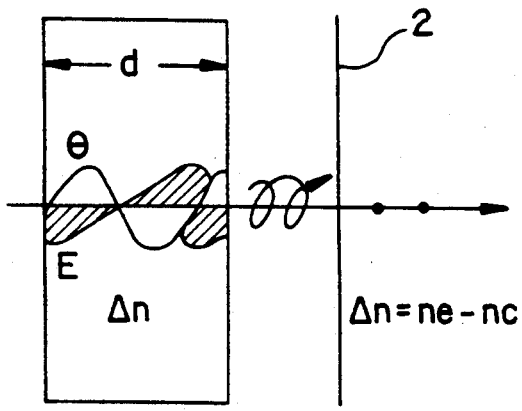
FIG. 4 is a principle drawing showing the relation between the director of modulation layer and the polarizer.
Figure 4B:
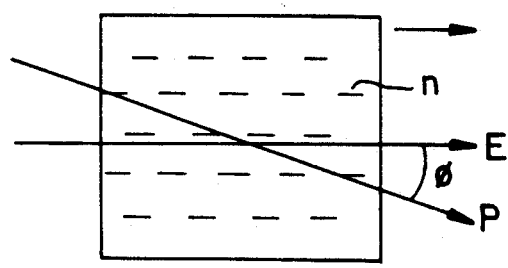
Figure 5:
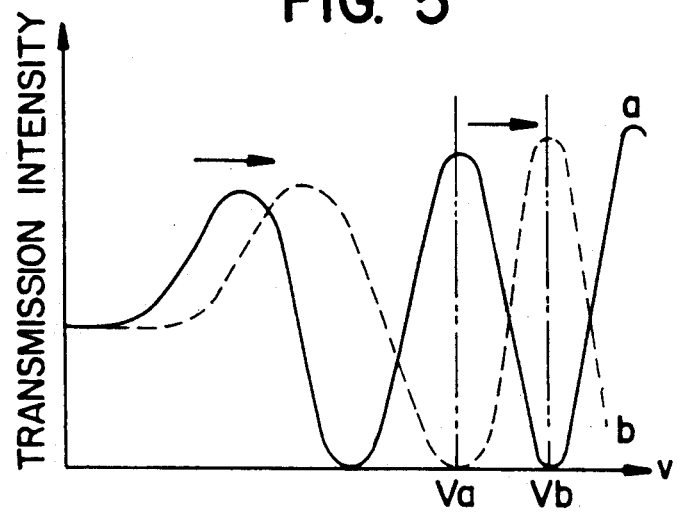
FIG. 5 is a characteristics diagram showing the relation between the drive voltage applied to the birefringent material and the transmission intensity.
Figure 21:
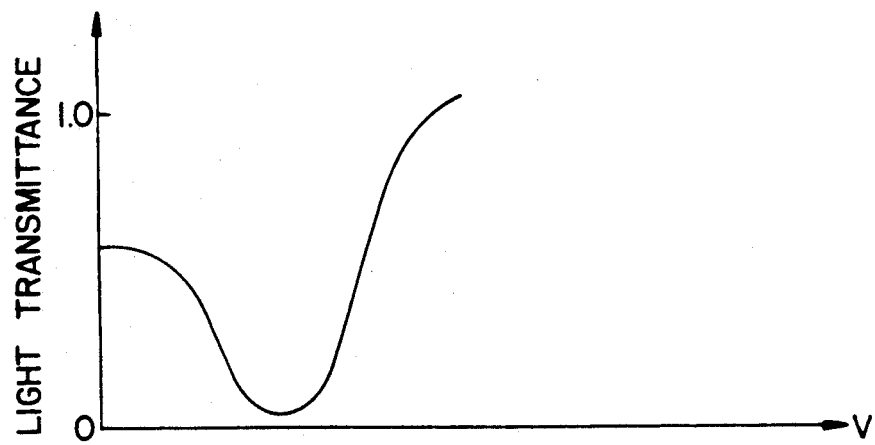
FIG. 21 is a characteristics diagram showing the relation of drive voltage versus transmission intensity wherein the dependence of modulation component itself on wavelength is reduced.

The dependence of modulator component itself on wavelength can be lowered by selecting a proper value of retardation ($R = \Delta n \cdot d/\lambda$). Then, the light transmittance I is given by $$I = \sin^2(2\theta) \cdot \sin^2(\pi \cdot \Delta n \cdot d/\lambda) \quad (2)$$

where the initial condition to maximize the light transmittance I is $\sin^2(2\theta) = 1.\theta$ is the angle between the director n of modulation layer (see FIG. 4(B)) and the polarizer P. For example, when $\theta = 45°$, I is given by $$I = \sin^2(\pi \cdot \Delta n \cdot d/\lambda) \quad (3)$$

where $R = \Delta n \cdot d/\lambda$ is changed fundamentally according to the drive voltage. However, if $R = \Delta n \cdot d/\lambda = 1$, the transmission intensity has one peak to the drive voltage and the maximum contrast can be obtained at lower drive voltage as shown in FIG. 21. Thus, the phase difference between the ordinary ray and the extraordinary ray can be controlled to a half wavelength or less by controlling the wavelength band on the input side or the output side.

Figure 22:
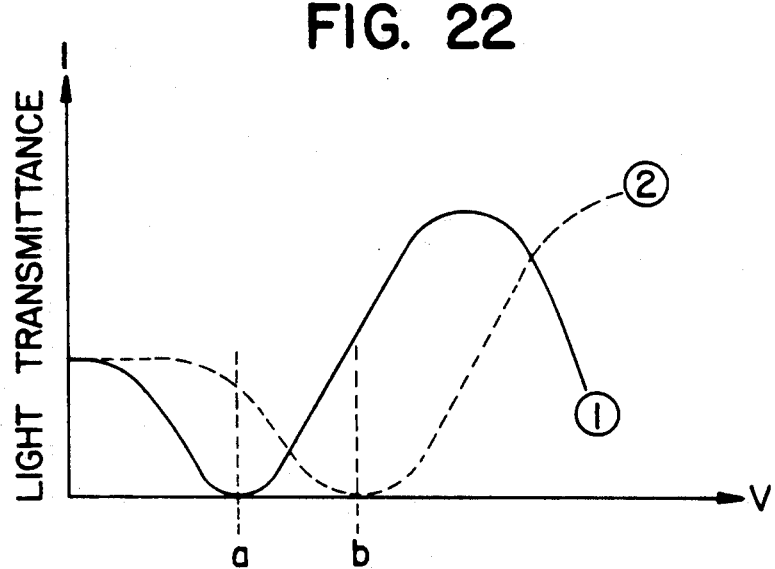
FIG. 22 is a characteristics diagram wherein the phase difference between the wavelengths, which are obtained by controlling the wavelength band, is controlled to one half wavelength or less.

FIG. 22 shows the characteristics diagram in the case that the phase difference between the wavelengths obtained by controlling the wavelength band is controlled to a half wavelength or less. The phase difference between the wavelength ① and ② is a half wavelength or less.

Figure 23:
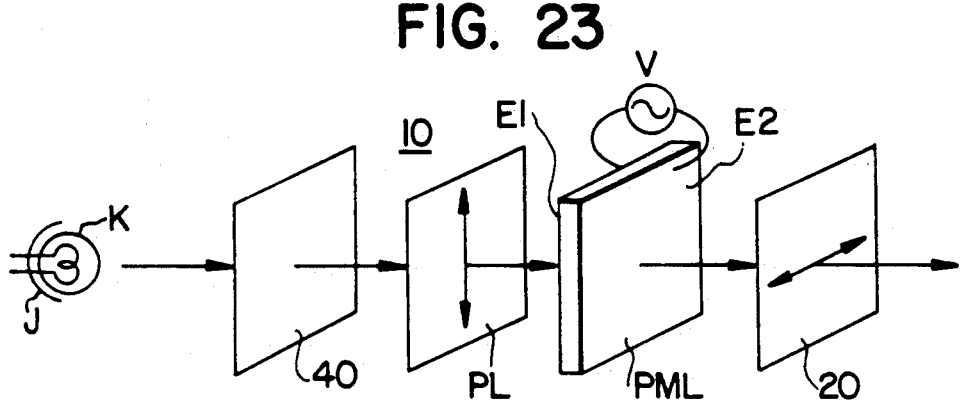
FIG. 23 is an are oblique side view showing fundamentally a different embodiment of the electromagnetic radiation beam modulator according to this invention.

Next, the example of the practical configuration according to this invention is described below in reference to the drawing. The electro-magnetic radiation beam modulator of this invention shown in FIG. 23 consists of the light source K, the reflection mirror J, the polarizer PL (polarizing plate), the analyzer 20 (polarizing plate), the optical modulator component PML, the wavelength selection filter 40 and the voltage source (available both for A.C and for D.C) which applies voltage to the electrodes $E_1$ and $E_2$ which are formed on both surfaces of the component PML. In the double refraction, when the light is not linearly polarized, both the vertically polarized light and the horizontally polarized light are emitted including the information. Therefore, the polarizer PL is put in on the inlet side and the analyzer 20 is put in on the outlet side to be able to put out the phase shift by the double refraction.

The light from the light source K often has various planes of polarization and (except for special ones) various wavelengths, but when it is passed through the wavelength selection filter 40, only the light of special wavelength band (monochromatic light) is emitted, further only the light of one plane of polarization (vertical direction in the example in this figure) is selected by the polarizer PL and supplied to the component PML. Then, only the light modulated by this component (horizontal plane of polarization in this embodiment) is passed through the analyzer 20 and the other component is shut off. Hereby, the phenomenon that the operating point changes with the wavelength of electromagnetic radiation beam, such as light, is reduced and the information, such as image, which is formed on the optical modulator component PML can be read with higher contrast than previously possible.

Figure 24:
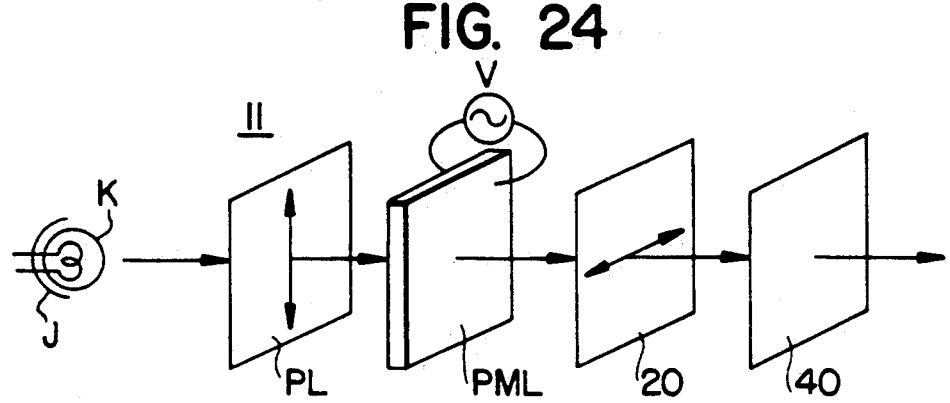
FIG. 24 is an oblique side view similar to the embodiment of FIG. 23 except that the wavelength selection filter is located at the outlet side of the modulator.
Figure 25:
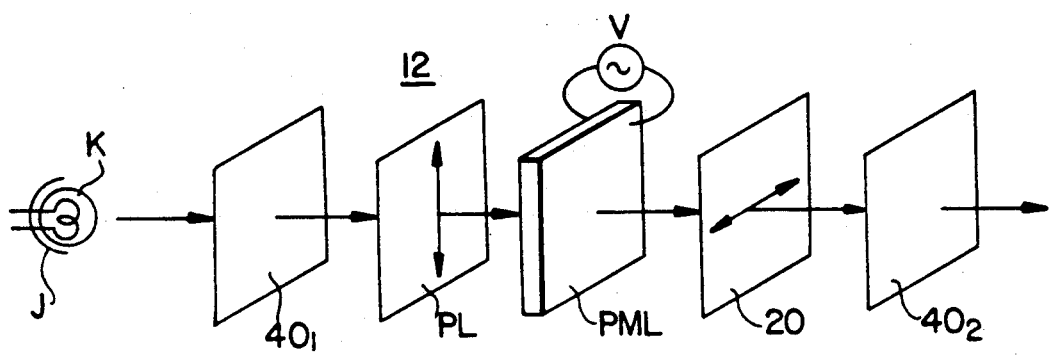
FIG. 25 is an oblique side view similar to that of FIG. 23 except that two wavelength selection filters are used, one at the inlet side and one at the outlet side of the modulator.

Further, in the electromagnetic radiation beam modulator 10, the wavelength selection filter 40 is located between the light source K and the polarizer PL, i.e. on the incident side, but as shown in the embodiment 11 in FIG. 24 for example, almost the same effect can be obtained by locating the wavelength selection filter 40 on the back side of the analyzer 20 (outlet side). Furthermore, as shown in the embodiment 12 in FIG. 25, a clearer effect is obtained by setting the wavelength selection filters on both sides. It is of course evident that the central wavelengths of both wavelength selection filters $40_1$ and $40_2$ should be nearly equal.

Figure 26:
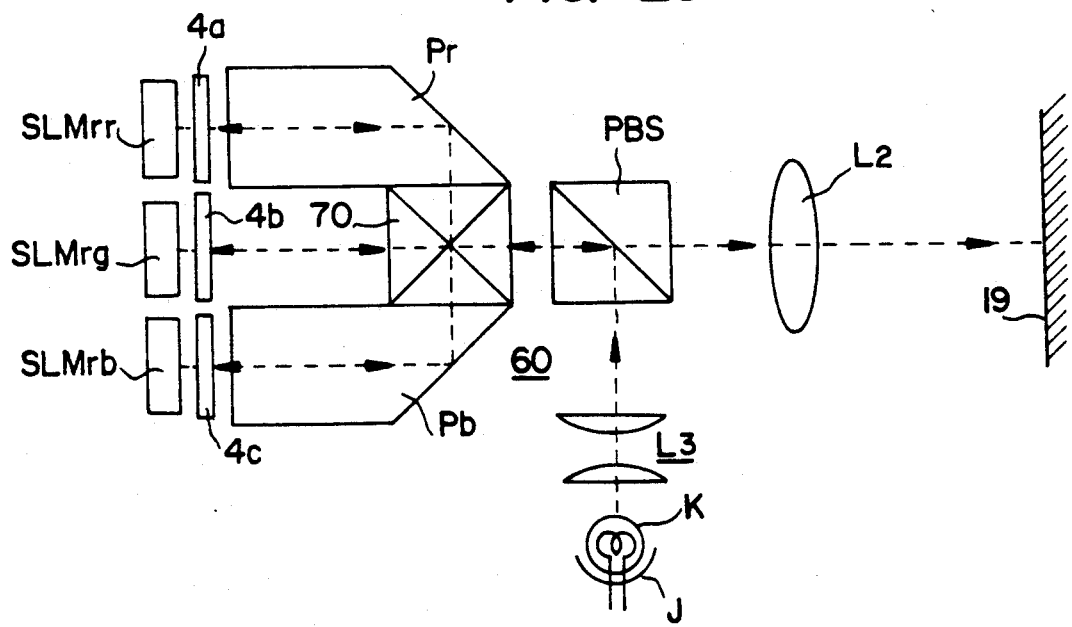
FIG. 26 is a principle drawing of the display unit which is formed by using the reflex optical modulator component (electro-magnetic radiation beam modulator).

Hereupon, the wavelength selection filter 40 passes only specific monochromatic light as described above, but the display unit can be deemed to be an application example which uses three kinds of wavelength selection filter $4a$, $4b$ and $4c$ as shown in FIG. 26 which pass the primary colors of light R, G and B respectively, records the information corresponding to each color, R, G and B of the object image into the optical component and makes the color display by using the three color separation and combination optical system. FIG. 26 shows an example of configuration of the display unit which is an application example of such unit; that is, an embodiment of the display unit according to this invention which uses the reflection type of light-light conversion element. It is equipped with the reflection optical modulator elements SLMrr, SLMrg and SLMrb, the wavelength selection filters $4a$, $4b$ and $4c$, the three color separation and combination prism 60, the dichroic mirror 70, the prisms Pr and Pb, the polarization beam splitter PBS, the screen 19 and the lenses L2 and L3.

The white light from the light source K is reflected on the polarization beam splitter PBS and separated into three colors R, G and B by the dichroic mirror forming the three color separation and combination prism 60. The green light G among them goes straight through the wavelength selection filter $4b$, is modulated by the modulator element SLMrg and reflected, and incident on the dichroic mirror 70 again. The red light (R) and the blue light (B) are respectively reflected in the mutually opposite direction, incident on the modulator elements SLMrr and SLMrb through the prisms Pr, Pb and the wavelength selection filters $4a$, $4c$, modulated and reflected here and incident on the dichroic mirror 70 again, finally after the three color combination, projected to the screen 19 through the lens L2 and displayed.

In addition, the transmission light-light conversion element which uses the transmission optical modulator elements ECBrr, ECBrg and ECBrb instead of the reflex optical modulator element SLMrr, SLMrg and SLMrb can be used to form the display unit. In this case, the polarization beam splitter PBS is unnecessary, but the three color separation prism and the three color combination prism having the same configuration with above mentioned three color separation and combination prism 60 are required.

While the presently preferred embodiments of the present invention have been shown and described, it is to be understood these disclosures are for the purpose of illustration and that various changes and modifications may be made without departing from the scope of the invention as set forth in the appended claims.

What is claimed is:

1. An optical system for reading an optical image written as a charge image in a light modulator having a photo-modulation component operating in a birefringent mode under the presence of a first electric field, an unpolarized light entering the system for reading the image from said light modulator via said optical system, the system comprising:

first optical means for separating a first linearly polarized light from said unpolarized light;

generating means for generating a second electric field;

second optical means coupled to said generating means, responsive to said first linearly polarized light, said second optical means exhibiting birefringence under the control of said second electric field, for obtaining a second linearly polarized light of light components having polarization planes in accordance with wavelengths of said light components; and third optical means, responsive to one of said light components having a specific wavelength of said second linearly polarized light, for obtaining a third linearly polarized light having a polarization plane which is identical to a polarization plane of said one light component in accordance with the specific wavelength of said second linearly polarized light, wherein said photo-modulation component and said first, second and third optical means constitute a wavelength selection filter to make a wavelength range of said third linearly polarized light narrower than a wavelength range of said unpolarized light, said third linearly polarized light of said narrowed wavelength range entering said photo-modulation component of said light modulator to read said image.

2. An optical system for reading a plurality of optical images written as charge images in a plurality of light modulators, respectively, each light modulator having a photo-modulation component operating in a birefringent mode under the presence of a first electric field, an unpolarized light entering the system for reading said images from said light modulators via the optical system, the system comprising;

first optical means for separating a plurality of first linearly polarized lights from said unpolarized light;

generating means for generating a second electric field;

a plurality of second optical means respectively coupled to said generating means, responsive to said plurality of first linearly polarized lights, each of said second optical means exhibiting birefringence under the control of said second electric field, for obtaining a plurality of second linearly polarized lights; and third optical means, responsive to said plurality of second linearly polarized lights, for obtaining a plurality of third linearly polarized lights, a polarization plane of each of said third linearly polarized lights being different from a polarization plane of each of said second linearly polarized lights, wherein said photo-modulation component, each of said plurality of second optical means and said first and third optical means constitute a wavelength selection filter to make a wavelength range of respective third linearly polarized lights narrower than a wavelength range of said unpolarized light, said third linearly polarized lights of said narrowed wavelength range entering said light modulators to read the images respectively.

3. Apparatus as claimed in claim 2, wherein said optical images are of three primary colors written respectively on three light modulators, and each of said plurality of first linearly polarized lights correspond respectively to said three primary colors.

4. Apparatus as claimed in claim 3, wherein said first optical means includes a beam splitter for providing said plurality of first linearly polarized lights and three-color separation means for separating three first linearly polarized lights of red, green and blue from said plurality of first linearly polarized lights.

5. Apparatus as claimed in claim 4, wherein said three-color separation means includes first, second and third prisms, a first dichroic filter between said first and second prisms and a second dichroic filter between said second and third prisms.

* * * * *